United States Patent [19]

Briskman et al.

[11] Patent Number: 5,485,485

[45] Date of Patent: Jan. 16, 1996

[54] RADIO FREQUENCY BROADCASTING SYSTEMS AND METHODS USING TWO LOW-COST GEOSYNCHRONOUS SATELLITES AND HEMISPHERICAL COVERAGE ANTENNAS

[75] Inventors: Robert D. Briskman, Bethesda, Md.; John M. Seavey, Cohasset; Paul Medeiros, Fall River, both of Mass.

[73] Assignee: CD Radio Inc., Washington, D.C.

[21] Appl. No.: 227,045

[22] Filed: Apr. 13, 1994

Related U.S. Application Data

[63] Continuation-in-part of Ser. No. 48,663, Apr. 16, 1993, Pat. No. 5,319,673, which is a continuation-in-part of Ser. No. 866,910, Apr. 10, 1992, Pat. No. 5,278,863.

[51] Int. Cl.$^6$ ........................................................ H04B 1/69
[52] U.S. Cl. ............................................. 375/200; 655/13.2
[58] Field of Search ........................... 375/200; 455/12.1, 455/13.1, 13.2

[56] References Cited

U.S. PATENT DOCUMENTS

| | | | |
|---|---|---|---|
| 5,278,863 | 1/1994 | Briskman et al. | 375/200 |
| 5,319,673 | 6/1994 | Briskman et al. | 375/200 |

Primary Examiner—Salvatore Cangialosi

[57] ABSTRACT

The methods and systems for reducing multipath fading and outage from blockage in a radio broadcasting system that is adapted to simultaneously broadcast signals having frequencies in the range of about 300 MHz to about 3,000 MHz from two or more satellite sources traveling on a substantially geosynchronous orbit with the satellite sources separated from one another by a sufficient distance to minimize outage from physical blockages and multipath fading of signals from these satellites and received by a plurality of fixed and mobile platforms using substantially flat, hemispherical coverage antennas, each antenna having an outer diameter no greater than about 10 inches and each adapted to receive frequencies in the range of about 300 MHz to about 3,000 MHz.

29 Claims, 9 Drawing Sheets

RADIO FREQUENCY BROADCASTING SYSTEMS AND METHODS USING TWO LOW-COST GEOSYNCHRONOUS SATELLITES AND HEMISPHERICAL COVERAGE ANTENNAS

This application is a continuation-in-part of U.S. patent application Ser. No. 08/048,663 filed Apr. 16, 1993, which is a now U.S. Pat. No. 5,319,673 continuation-in-part of U.S. patent application Ser. No. 07/866,910 filed Apr. 10, 1992 in the U.S. Patent & Trademark Office, and entitled "RADIO FREQUENCY BROADCASTING SYSTEMS AND METHODS USING TWO LOW-COST GEOSYNCHRONOUS SATELLITES" now U.S. Pat. No. 5,278,863.

BACKGROUND OF THE INVENTION

Over the past several years, proposals have been made in the United States at the Federal Communications Commission (FCC) and, internationally, at the International Telecommunications Union (ITU) to broadcast radio programs from geosynchronous satellites to receivers in mobile platforms (e.g., automobiles) and in other transportable and fixed environments. Since geosynchronous satellites are located in near-equatorial orbits approximately 42,300 kilometers from the earth's surface, such satellites appear stationary to an observer on the ground. The satellite views roughly one-third of the earth's surface below it, which allows radio broadcast coverage of such a large area or, by using directional antennas on the satellite, a sub-area such as a particular country. This potential national coverage area of many tens of millions of square kilometers for providing radio service throughout the continental United States (or other country/region) is the main feature of satellite radio broadcasting, since normal terrestrial AM/FM radio stations typically cover a much smaller area.

Figure 1:
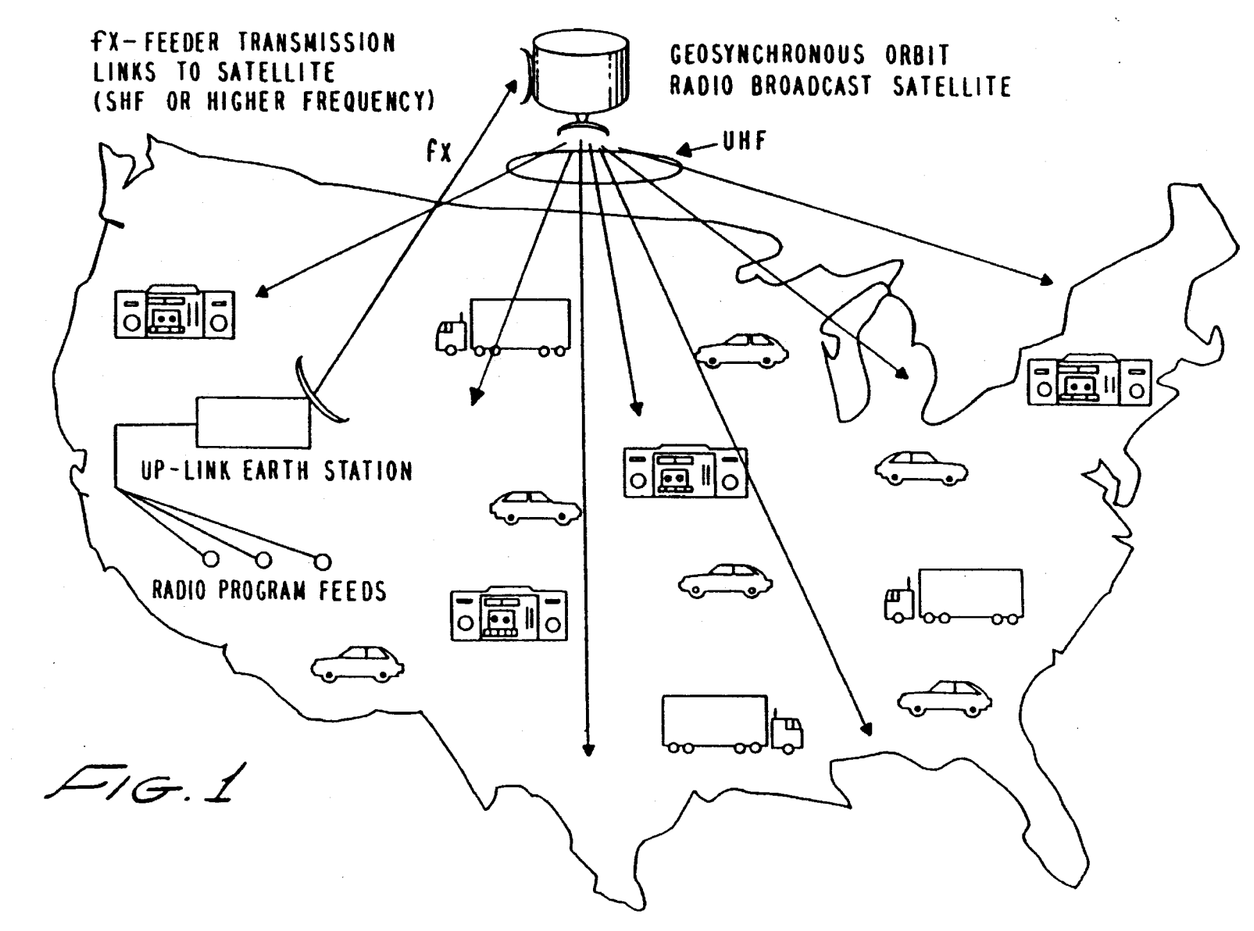
FIG. 1 shows a UHF radio broadcast satellite system utilizing a single satellite source.

Radio broadcasting from satellites involves use of special receivers in mobile or fixed platforms because of technical implementation and frequency allocation/interference requirements. Consequently, proposals for building such systems have generally used UHF frequencies in the range of about 300 to about 3,000 MHz. FIG. 1 shows a typical satellite radio broadcasting system. Additional satellites can be used with the satellite system shown in FIG. 1 for providing redundancy, additional channels or both. FIG. 1 shows the most important transmission path, the path from the satellite to the mobile or fixed platforms. Since a mobile platform requires an antenna which can receive satellite signals from all azimuths and most elevation angles, the mobile platform antenna gain must be low (e.g. 2–4 dBi gain is typical). For this reason, the satellite must radiate large amounts of radio frequency transmitter power so that the mobile platform receiver can receive an adequate signal level.

Figure 2:
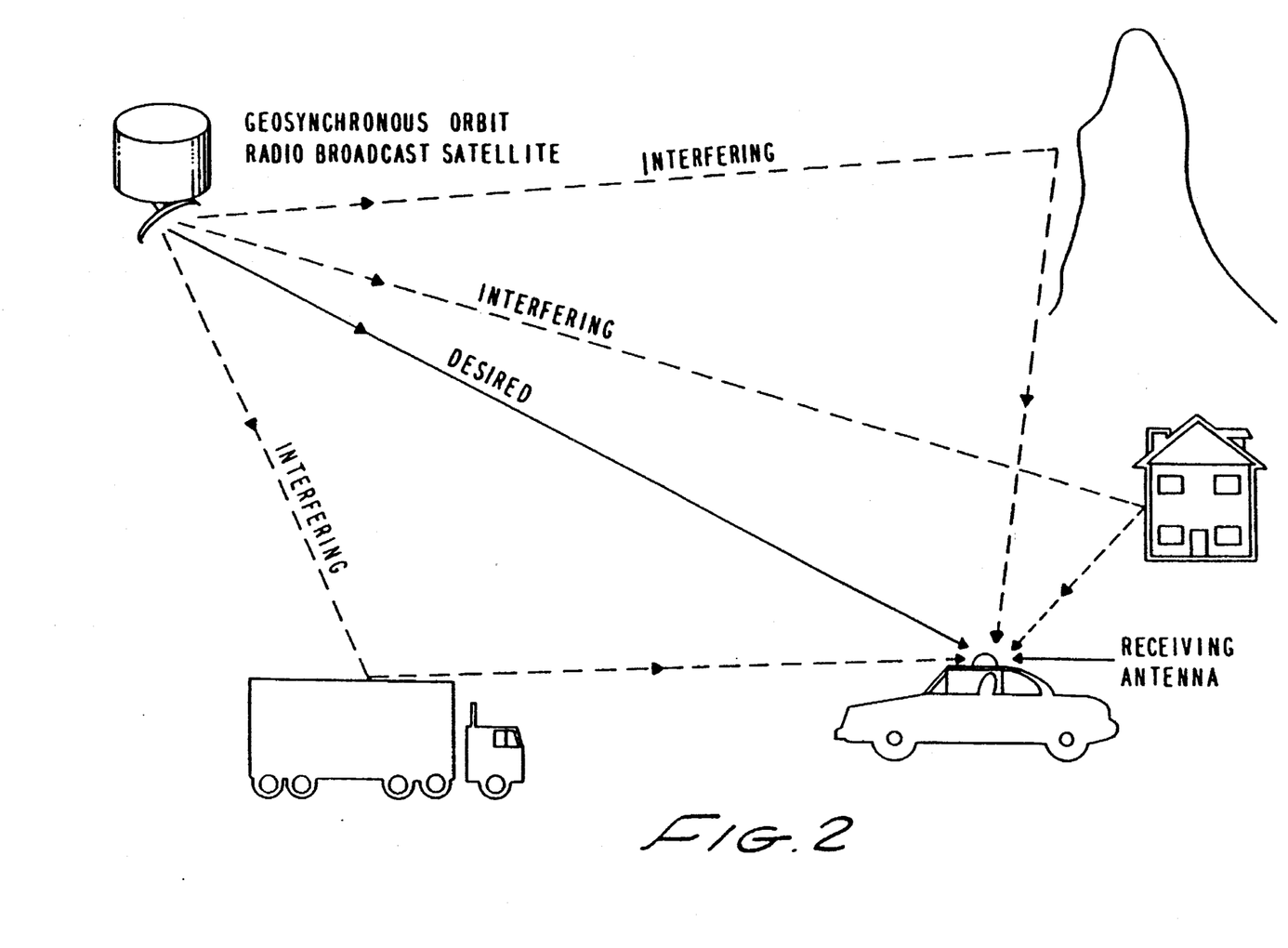
FIG. 2 shows multipath fading that occurs in UHF radio broadcasting from satellites.

In addition to the need for a high power transmitter in the satellite is the need for extra transmitter power, called "transmission margin", to overcome multipath fading and attenuation from foliage. Multipath fading occurs where a signal from a satellite is received over two or more paths by a mobile platform receiver. One path is the direct line-of-sight or desired path. On other paths, the signal from the satellite is first reflected from the ground, buildings, or trucks, and then received by a mobile platform receiver, as FIG. 2 shows. These other paths are interfering in amounts that depend on factors such as losses incurred during reflection.

Among the methods for reducing multipath fading in radio systems, are the following:

1. Providing a second path for a desired signal between a transmitter and a receiver that is physically different from the first path for the signal. This is called space diversity, and is effective where only one of the two paths is strongly affected by multipath fading at any instant;

2. Providing a second transmission frequency for a desired signal between a transmitter and a receiver. This is called frequency diversity, and is effective where only one of the two frequencies is strongly affected by multipath fading at any instant; and 3. Providing signal modulation resistant to multipath fading such as spread spectrum. This method is effective where some resistance results from the large modulated frequency bandwidth used, and some resistance results from the receiver's rejection of an undesired signal's spreading code.

The transmission margin necessary to overcome multipath fading or attenuation from foliage has been both measured and estimated by experts to be in the range of about 9 to about 12 dB for satellite radio broadcast systems operating at UHF frequencies with reception at mobile platforms having roughly 20° or more elevation angle to the satellites. Fortunately, multipath and attenuation from foliage seldom occur simultaneously. However, the need for 9–12 dB transmission margin means that satellite transmitter power must be increased by a factor of 8 to 12 over its initially high level. Radio broadcasting satellites operating at such power levels would be extremely large, complex and costly. To date, no commercial system of this kind is in use because of this high cost.

Figure 3:
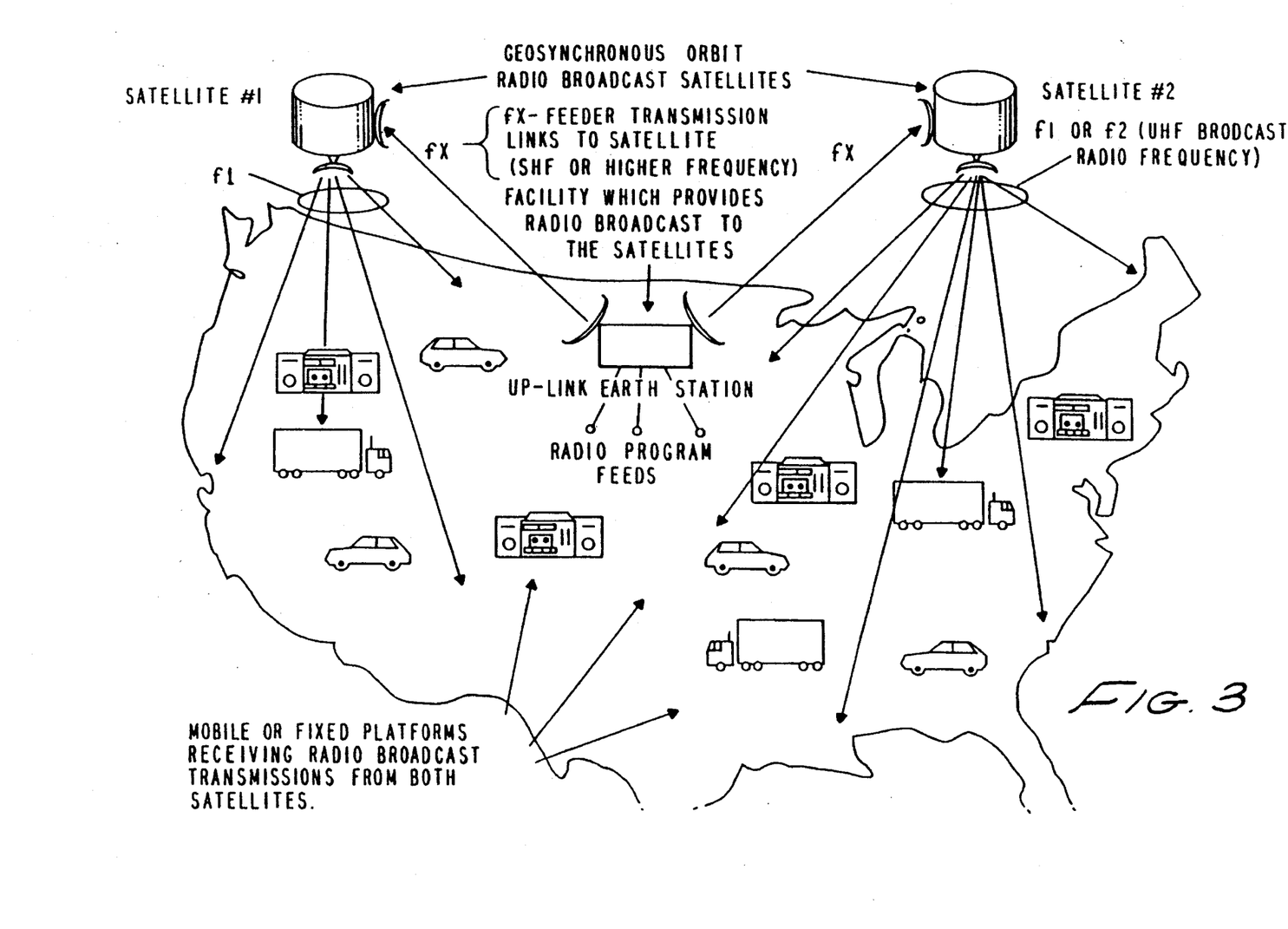
FIG. 3 shows an embodiment of the UHF radio frequency broadcasting system of this invention utilizing two spatially separated satellite sources on substantially the same geosynchronous orbit.

The systems and methods of this invention overcome these problems, by sending the same radio broadcast signals substantially simultaneously through two or more geosynchronous satellite sources separated by a sufficient number of degrees of orbital arc to minimize the effects of multipath fading and foliage attenuation, as FIG. 3 shows.

A receiver on a mobile or fixed platform receives the two signals through two physically distinct paths in space diversity methods, and selects the stronger signal, or combines the two signals. The signals can be at the same radio frequency using a modulation resistant to multipath interference, or at a different radio frequency, with or without a modulation resistant to multipath. Foliage attenuation is minimized because trees and other foliage are seldom in the line-of-sight to both satellites at the same time.

Receivers on mobile and fixed platforms receive the two signals through the two physically distinct transmission paths and select the stronger signal or combine the two signals to achieve space diversity capability. The signals can be at the same radio frequency and avoid interfering with each other by use of spread spectrum modulation with code division multiple access, or by transmitting the radio signals from each satellite with opposite polarizations (e.g. cross or orthogonal polarizations such as horizontal linear/vertical linear or left circular/right circular). Where isolation of the two signals is achieved by opposite polarizations, any analog or digital signal modulation may be used. Alternatively, the two signals can be transmitted from the two satellites at different radio frequencies, which has the advantage of achieving frequency diversity capability in addition to the space diversity capability. Where different satellite frequencies are used, the signals may be transmitted using any analog or digital modulation.

In preferred embodiments, these systems and methods provide radio broadcasts from geosynchronous satellites with one-eighth or less the power needed with a single satellite. Since satellite cost is directly proportional to satellite transmitting power, the radio broadcast satellite system of this invention uses satellites about one-eighth or less as costly and as heavy as single satellite systems. The reduced satellite mass also permits the use of a lower capability, lower cost launch vehicle. Even if two launch vehicles are needed, the satellite portions of the subject system are still only about one-fourth as costly as a single satellite transmission system.

Figure 4:
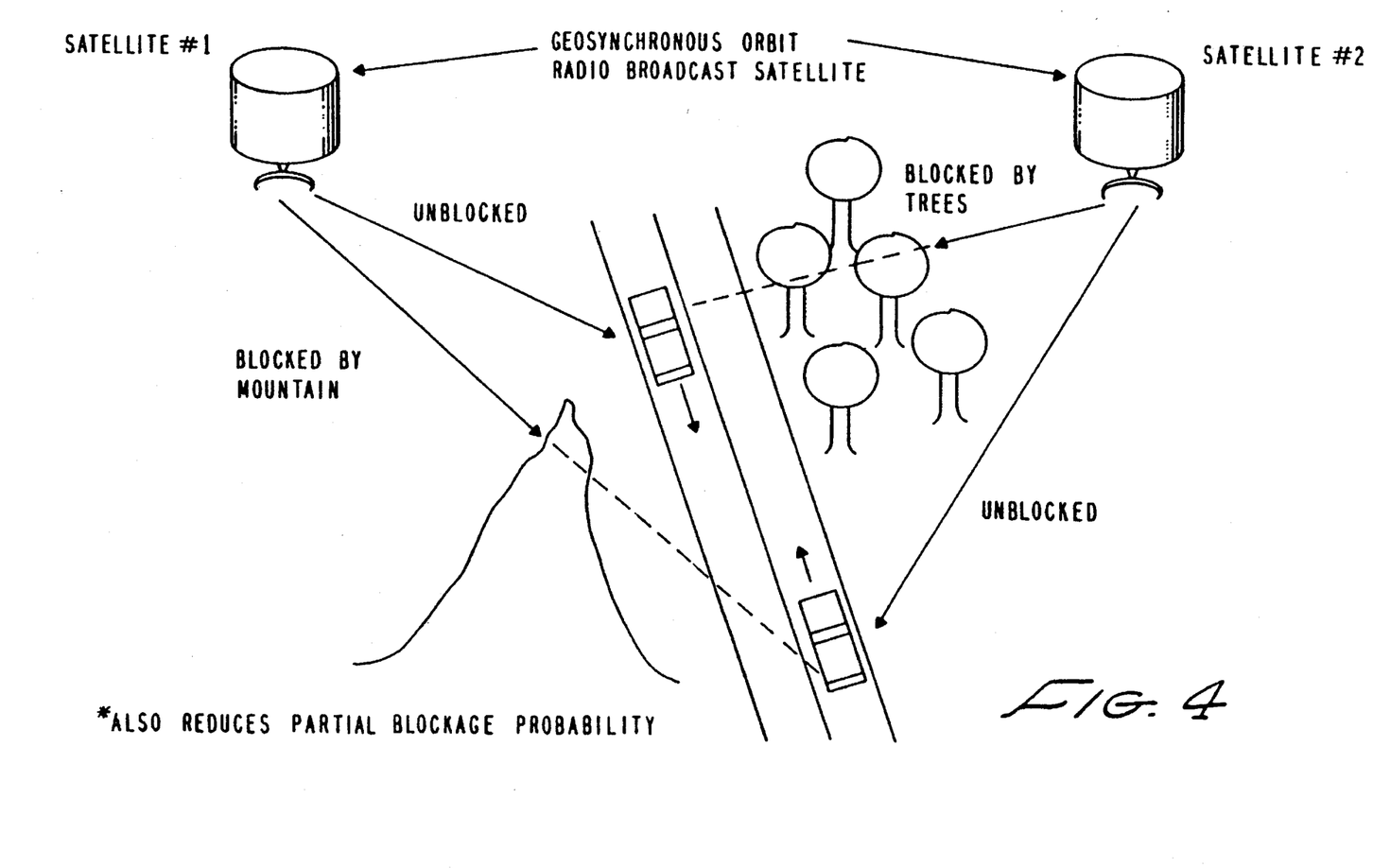
FIG. 4 illustrates the reductions in total and partial blockage outages attainable with the two-satellite system embodiment shown in FIG. 3.

The subject system substantially improves reception quality by eliminating many blockage outages. Blockage outages occur when physical objects such as buildings or hills lie in the line-of-sight between the satellite and the receiver. As FIG. 4 shows, such blockage seldom occurs simultaneously on both satellite paths. FIG. 4 also shows that signal attenuation from foliage is minimized, because such attenuation results from partial signal blockage.

SUMMARY OF THE INVENTION

This invention relates to a system of two or more satellites moving in spatially separated positions on substantially the same geosynchronous orbit, each sending or relaying, substantially simultaneously, preferably at UHF frequencies in the range of about 300 to about 3,000 MHz, the same radio broadcast signal to receivers at or near the earth's surface. The spatial separation of the satellites is sufficient to minimize multipath fading, foliage attenuation, or both. Preferably, the separation between any two satellites is in the range of about 25° to about 50°. These signals are preferably digitally modulated for high fidelity, but may also be analog.

This invention also relates to antennas for use with this satellite broadcasting system in the receivers at or near the earth's surface. In preferred embodiments, these antennas are receptive and efficient over a hemisphere operating at UHF frequencies in the range of about 300 to about 3,000 MHz. These antennas are preferably small, low in cost, and efficiently provide near hemispherical coverage. This hemispherical range allows a receiver on a mobile platform, such as an automobile, to view the satellites continuously as the platform moves over large geographical areas. In preferred embodiments, the antenna is a substantially flat disk having an outer diameter in the range of about 1 to about 10 inches, a thickness in the range of about 0.1 to 1 inch, and utilizes left-hand or right-hand circular polarization, or both.

These antennas, sometimes called "patch" or "planar array" antennas, generally have a disk shape, with the bottom side of the disk being metallized to form a ground plane. The center portion of the disk is a dielectric wafer, preferably made of ceramic or a polymer plastic. The top surface of the disk contains metalization which is the active element in a single patch or several elements connected together in an array. The shape, placement on the disk and size of the active element(s), in conjunction with the thickness and dielectric constant of the wafer, determine the antenna's reception coverage area, efficiency, center frequency and bandwidth. The received satellite energy from the active element is connected to the receiver, preferably by a lead inserted through the wafer/ground plane or from the top edge of the disk.

BRIEF DESCRIPTION OF THE DRAWINGS

The systems and methods of this invention can better be understood by reference to the drawings, in which.

DESCRIPTION OF THE PREFERRED EMBODIMENTS

Figure 5:
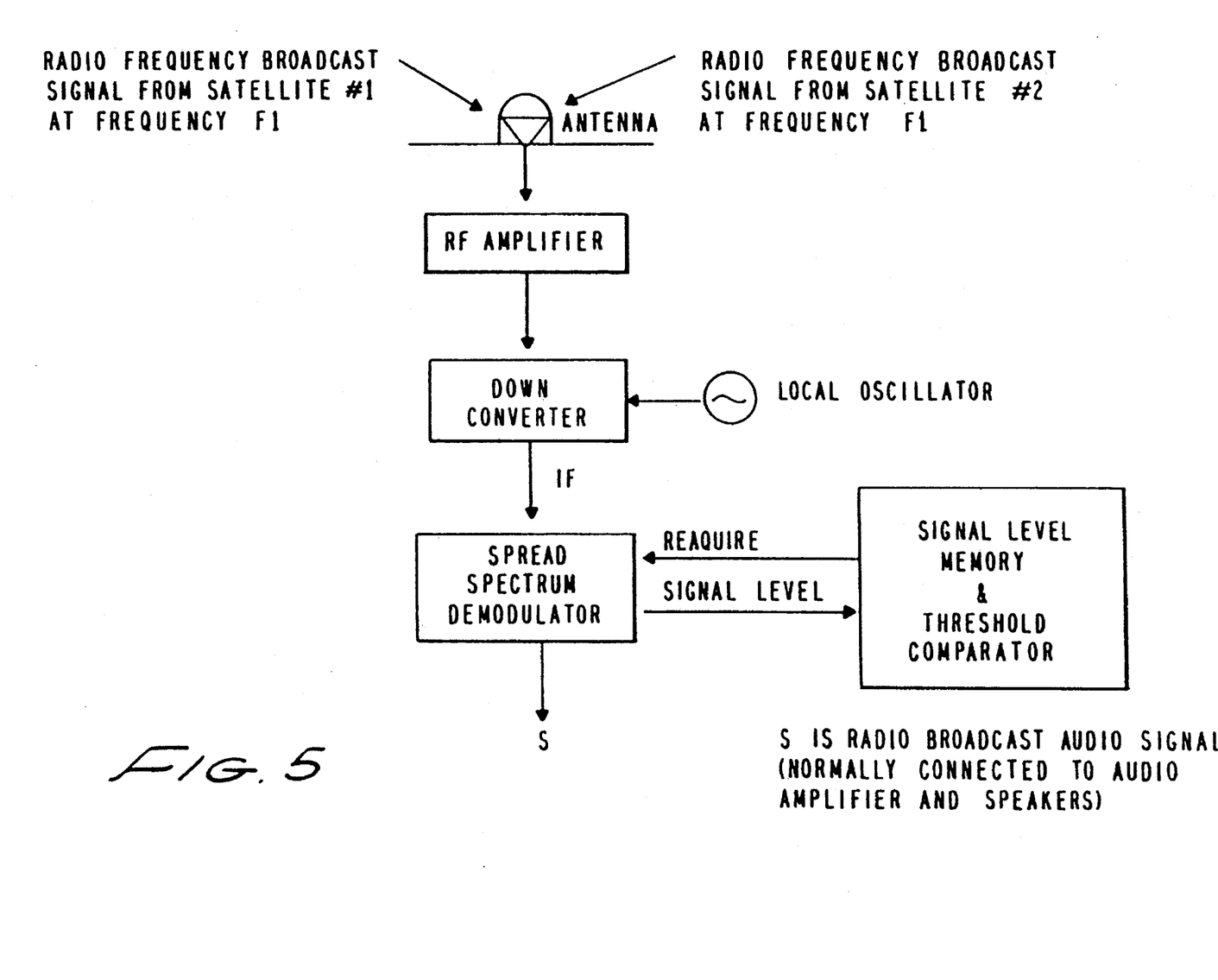
FIG. 5 shows a single correlator-type co-frequency satellite radio broadcast receiver for use with the two-satellite system embodiment shown in FIGS. 3 and 4.
Figure 6:
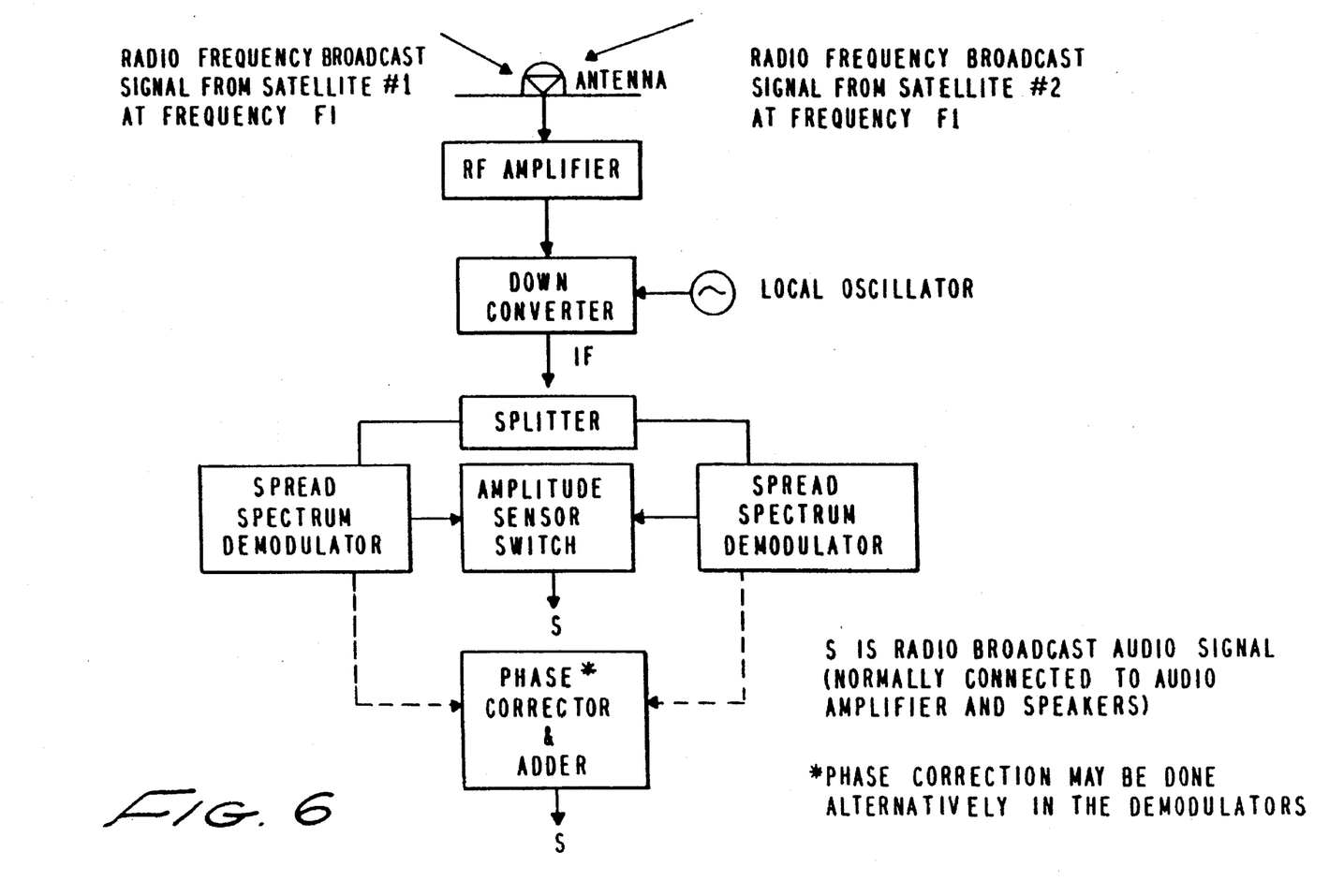
FIG. 6 shows a dual correlator-type co-frequency satellite radio broadcast receiver for use with the two-satellite system embodiment shown in FIGS. 3 and 4.

In the co-frequency embodiments of FIGS. 5 and 6, two satellites in substantially the same geosynchronous orbit send or relay substantially the same signal at substantially the same radio frequency. As a result, the receiver for the radio signals can be simple, and low in cost. The modulation method used preferably resists multipath interference and prevents mutual self-interference that would result in signal jamming. Methods such as spread spectrum modulation (e.g., direct sequence or frequency hopping) are preferably used to achieve Code Division Multiple Access (CDMA).

A preferred receiver for use in a mobile platform such as a vehicle is a standard, one-channel direct sequence spread spectrum detection device. This device is adapted to acquire the code of the signal from any of the satellites in the system. Preferably, this code is the same for the signals from both satellites, which is accomplished by having the satellites receive the radio signals to be transmitted to the mobile platform receiver from an up-link station on the earth's surface. Such an up-link station could delay one of the two codes in time to permit faster acquisition. In the mobile receiver, when the signal level drops a fixed, predetermined amount below a threshold value, such as an amount greater than 2 dB, a code loop is opened, and re-acquisition is performed on any signal stronger than the threshold value, as FIG. 5 shows in block diagram form.

In FIG. 5, the antenna receives the radio frequency signals from each of the two satellites. The signals are amplified by the radio frequency amplifier. The signals are changed from radio frequency to an intermediate frequency (IF) by the down converter. The specific intermediate frequency is chosen by the frequency of the local oscillator. One of the two signals is acquired and detected by the spread spectrum demodulator on a random basis and the other signal ignored. The signal level of the detected signal is sent to the Signal Level Memory and Threshold Comparator. The detected signal is then sent to an audio amplifier and loudspeakers for listening. The Signal Level Memory continuously receives the signal level of the detected signal and compares it with the previously sent values of signal level. When the current value of signal level falls a certain amount (i.e., to a preset threshold), the spread spectrum demodulator is forced to re-acquire a signal, and attempts to do so until a signal is re-acquired whose level is greater than the threshold level.

Alternatively, the receiver in the mobile platform can have common antenna, radio and intermediate frequency (IF) equipment. The IF feeds two correlators, each namely an independent spread spectrum code acquisition circuit and a detection circuit, as shown in FIG. 6.

In FIG. 6, the antenna receives the radio frequency signal from each of the two satellites. The signals are amplified by the radio frequency amplifier. The signals are changed from radio frequency to an intermediate frequency (IF) by the down converter. The specific intermediate frequency is chosen by the frequency of the local oscillator. The down converter output is split in half by the splitter, and presented to each spread spectrum demodulator. Each spread spectrum demodulator acquires and detects one of the two signals. The two signals can be recognized by either using a different code sequence for each signal, or by having an a priori time offset between the two signals' identical code sequence. Each spread spectrum demodulator sends the detected signal to either the Amplitude Sensor Switch, which outputs the stronger (higher level) one to an audio amplifier and loudspeakers for listening, or to the Phase Corrector and Adder, which shifts the signals so they are in phase with each other and then sums them. The sum is outputted to an audio amplifier and loudspeakers for listening. Alternatively, the phase correction can be accomplished in the Spread Spectrum Demodulators. The codes of the signals from the satellites can be substantially identical, but offset in time or orthogonal to one another, as are Gold codes. Each of the detected signals is derived from the correlators. The signals can then be selected individually, or combined with one another to produce a single, summed output signal.

The receiver preferably outputs a signal by one of two methods. The simpler method compares the amplitudes of the signals from the two satellite sources, and chooses the stronger signal for output. Alternatively, the phases of the two signals are adjusted until they are identical to one another. The two signals are then summed to produce an output signal. This method avoids switching the receiver from one signal to another, and provides better quality signals when the transmission paths of the two signals are unaffected, or are only partially attenuated by multipath fading or foliage. The previously mentioned phase adjustments are necessary because, although both satellite sources send substantially the same signal at substantially the same time, these signals reach the mobile platform receiver with different phases since the platforms are generally at a different distance from each satellite.

Figure 7:
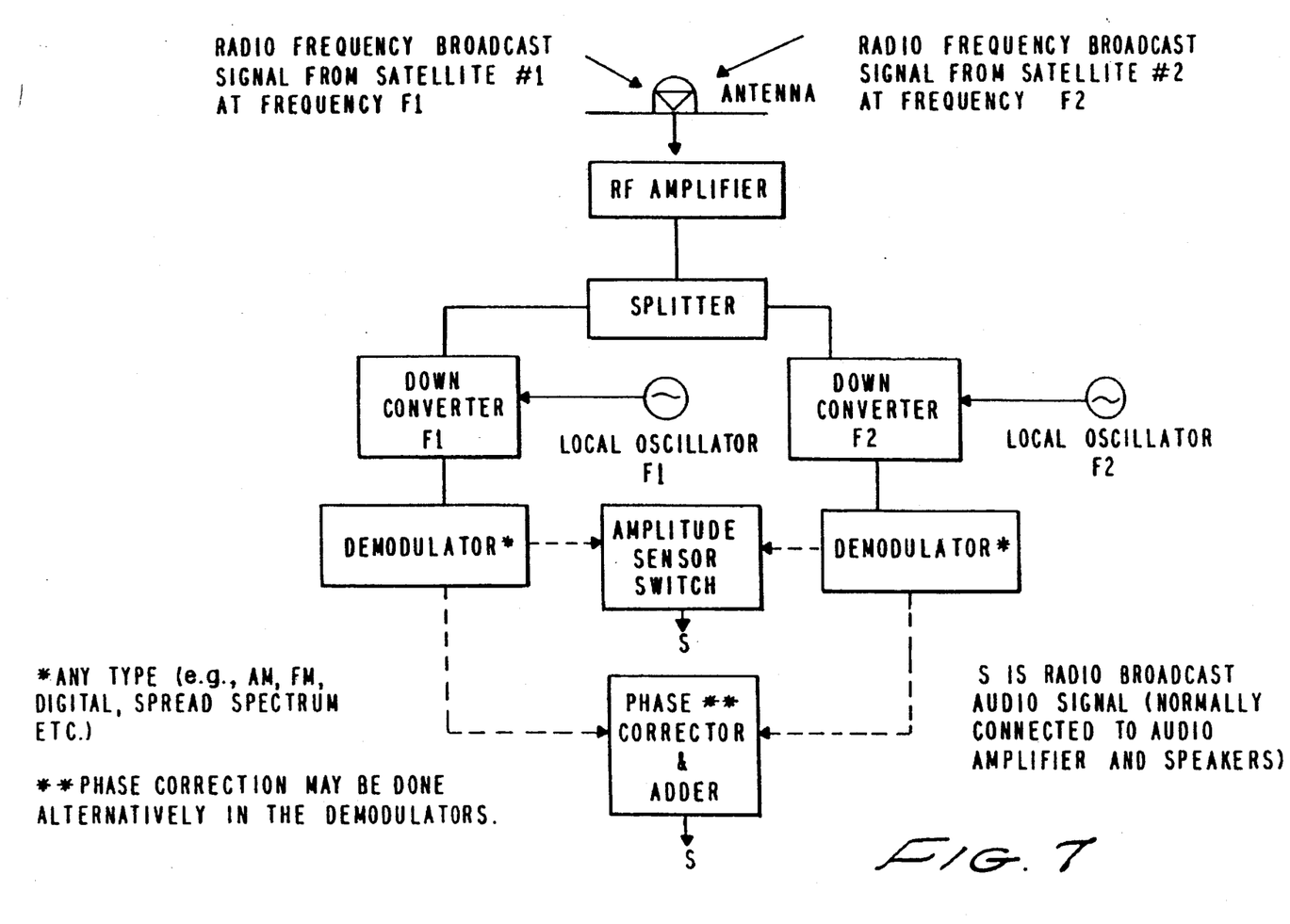
FIG. 7 shows a dual-frequency satellite radio broadcast receiver for use with the two-satellite broadcast system embodiment shown in FIGS. 3 and 4.

In the dual-frequency embodiments, both satellites send or relay substantially the same broadcast signal, but at two substantially different frequencies. These embodiments achieve less multipath fading because both space and frequency diversity are attained simultaneously. These embodiments further permit the use of multipath resistant modulation. However, the receiver is more complex. As FIG. 7 shows, such a receiver includes two down converters, intermediate frequency amplifiers and demodulator circuits. In FIG. 7, the antenna receives the radio frequency signal from each of the two satellites. The signals are amplified by the radio frequency amplifier. The radio frequency amplifier output is split in half by the Splitter and presented to each down converter. The signals are changed from radio frequency to an intermediate frequency (IF) by the down converters. The local oscillators are set to the proper frequencies so that the signal frequencies $F_1$ and $F_2$ are converted to the same IF. The IF from the down converters feeds the demodulators. The demodulators remove the signal modulation, and send the detected signals to either the Amplitude Sensor Switch, which outputs the stronger (higher level) one to an audio amplifier and loudspeakers for listening, or to the Phase Corrector and Adder, which shifts the signals so they are in phase with each other and then sums them. The sum is outputted to an audio amplifier and loudspeakers for listening. Alternatively, the phase correction can be accomplished in the demodulators.

Dual-frequency embodiments can be as shown in FIG. 7, or can be of a type which switches rapidly between the frequencies of the two signals, or can utilize digital signal processing. The output signals from the receiver can be selected by comparing the amplitudes of the two input signals, and using the stronger signal, or the input signals can be adjusted to the same phase and summed to produce an output signal.

Figure 8:
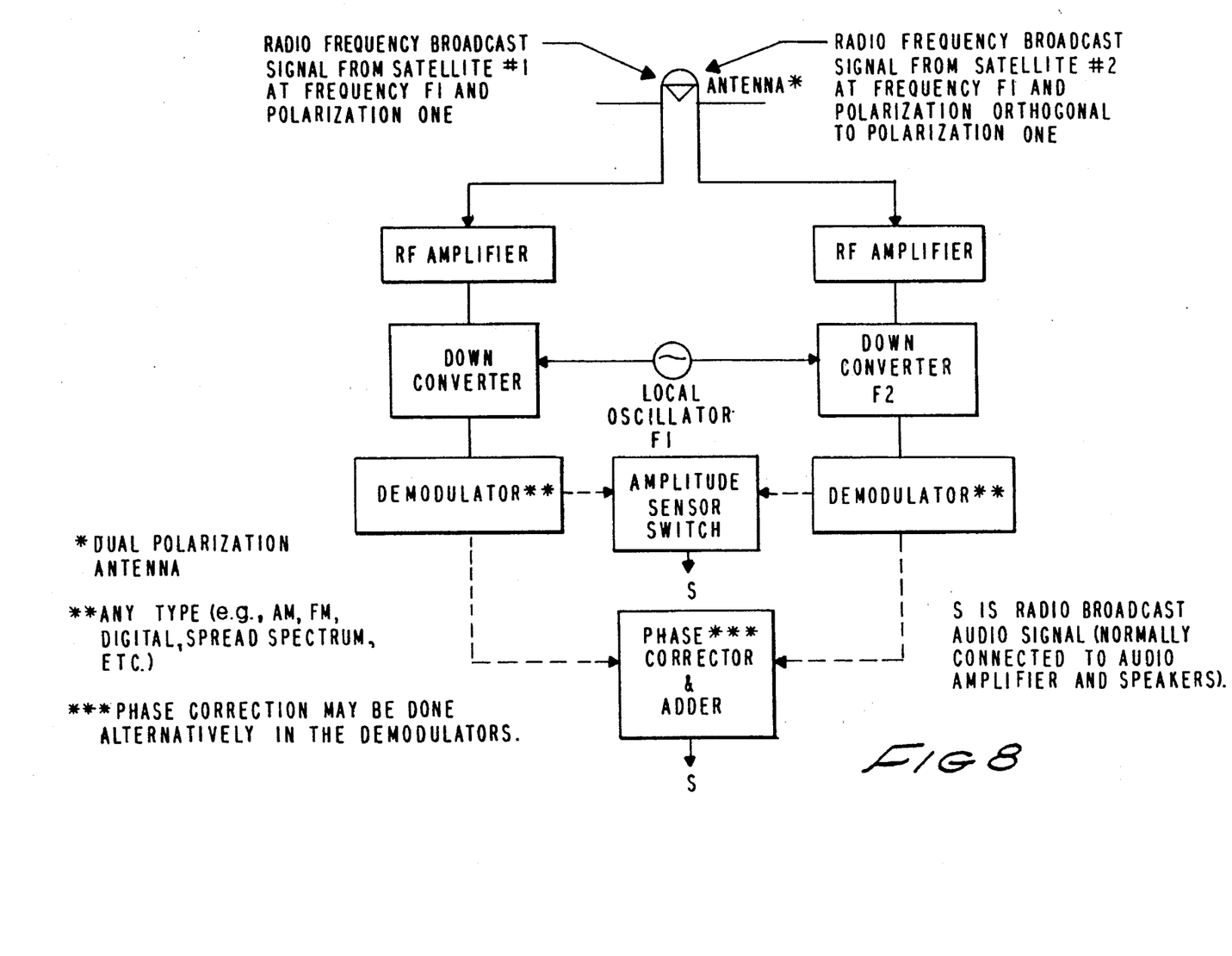
FIG. 8 shows a co-frequency satellite radio broadcast receiver employing two orthogonal transmission polarizations for use with the two-satellite embodiment shown in FIGS. 3 and 4.

Alternatively, the receiver in the mobile platform can have an antenna which accepts two orthogonal (or cross) polarized radio frequency transmissions (or two antennas, each accepting one of the two polarizations); radio frequency amplification, down conversion, intermediate frequency (IF) and demodulation equipment; and equipment for either selecting the stronger signal or phasing the two signals and then combining them as shown in FIG. 8.

In FIG. 8, one or more antennas receive the same radio frequency transmission from each of the two satellites at orthogonal polarizations. One satellite sends its radio frequency transmission at one polarization (e.g., right hand circular or vertical), and the second satellite sends the same radio frequency transmission at the orthogonal polarization (e.g., left hand circular or horizontal). The signals are electrically separated from each other by the cross polarization isolation of the antennas. The signals are individually amplified by radio frequency amplifiers, and then converted from radio frequency to intermediate frequency (IF), as by the down converters. The specific intermediate frequency is chosen by the frequency of the local oscillator.

The embodiment in FIG. 8 assumes that both satellites transmit their signals at the same radio frequency. However, different radio frequencies could be used by adding a second local oscillator. The down converters feed demodulators which are chosen to match the modulation used, since any type of analog or digital modulation can be employed. The demodulators remove the signal modulation, and send the detected signals to the amplitude sensor switch, which outputs the stronger, or higher level signal to an audio amplifier for listening, or to the phase corrector and adder, which shifts the signals so they are in phase with each other and then sums them. The summed signal is outputted to an audio amplifier and loudspeakers for listening. Alternatively, phase correction can be done in the demodulators.

Figure 9:
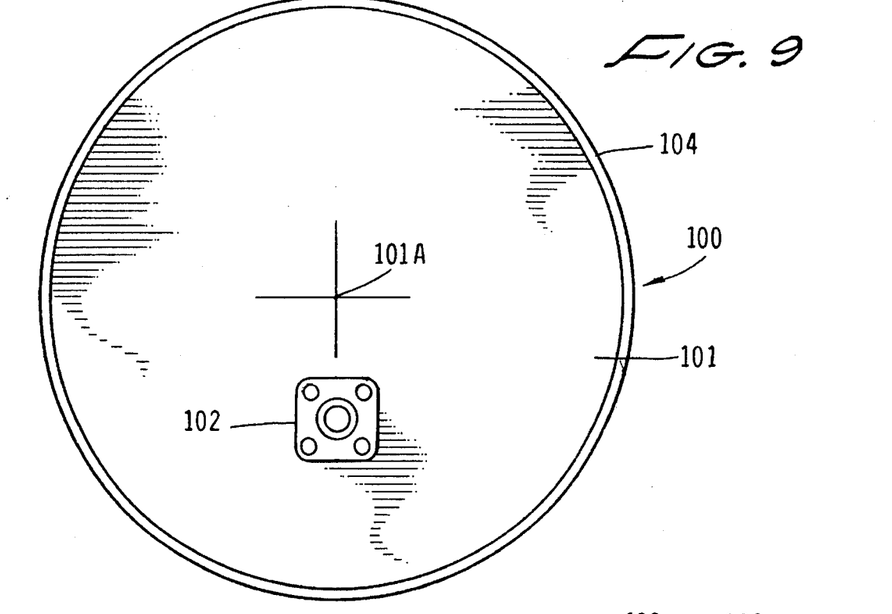
FIG. 9 shows a bottom plan view of a preferred embodiment of the hemispherical coverage antenna of this invention.
Figure 10:
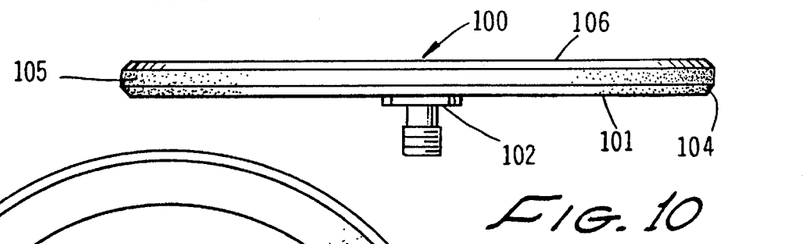
FIG. 10 shows an edge elevation view of the hemispherical coverage antenna shown in FIG. 9.
Figure 11:
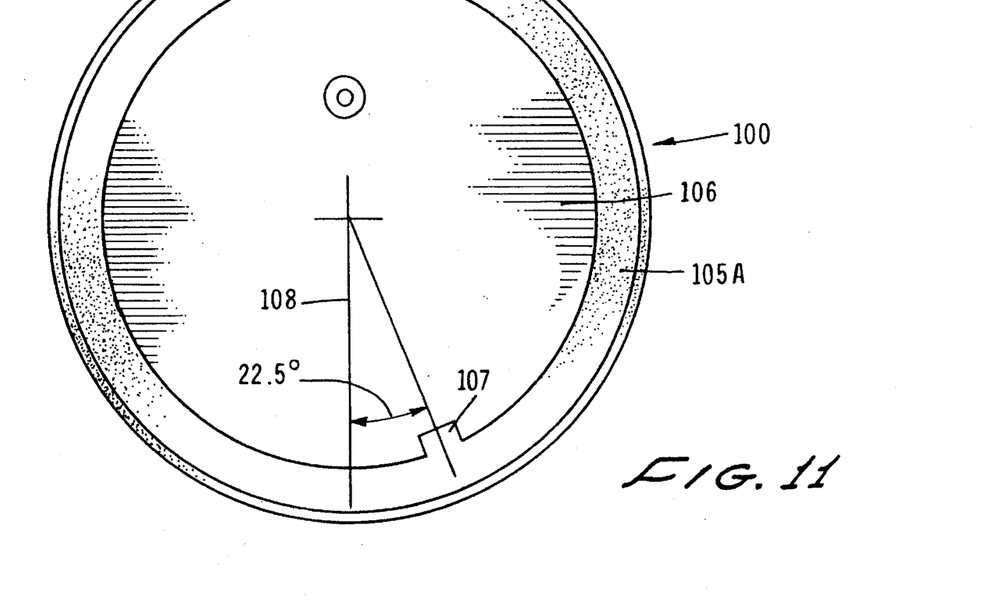
FIG. 11 shows a top plan view of the hemispherical coverage antenna shown in FIGS. 9 and 10.

FIGS. 9, 10 and 11 show a preferred embodiment of the hemispherical coverage antenna for use with the geosynchronous satellite fixed and mobile receiver system of this invention. The hemispherical coverage antenna 100 includes flat bottom layer 101 made of silver-palladium and measuring approximately 0.002 inch in thickness. About 0.375 inches from center 101A of bottom layer 101 is a female SMA connector 102, which, as FIG. 10 better shows, is attached to, and projects outwardly from, layer 101. Layer 101 is approximately 1.88 inches in diameter, and has a beveled edge 104, as best seen in FIG. 10. As best seen in FIG. 10, center layer 108 of antenna 100 is a ceramic disk, such as 96% Coors alumina, that functions as a dielectric. As FIG. 11 shows, top layer 106 is approximately 1.58 inches in diameter, thus leaving a smaller, peripheral region 105A around this top layer 106. Region 105A is approximately 0.33 inches in diameter. Notch 107 at the edge of layer 106 is approximately 22.5 degrees away from center line 108, is about 0.061 inch in width and is about 0.124 inch in length, and is aligned with connector 102 to achieve circular polarization.

Hemispherical coverage antenna 100 can readily be placed in an indentation of appropriate size and shape in the roof panel of a vehicle such as a car or truck, with female connector 102 protruding through an opening in the roof panel. A hardwire connection links connector 102 to a receiver (not shown).

Antenna 100 operates in the "TM 21" mode (a particular category of electronic energy resonance) in the 2310–2360 MHz frequency band, and is substantially smaller in diameter and thickness than similar antennas used to receive signals from GPS or other earth-orbiting satellites.

Among the many advantages of this hemispherical coverage antenna is that its gain is in the range of about 1 dB to about 4 dB, but its size is small and its weight is typically no greater than about 2 ounces. Moreover, its coverage efficiency is fully omnidirectional in azimuth and is effective for receiving transmissions from satellites arriving in the range of about 20° to about 60° elevation. This elevation angle range is where the satellites in the described radio broadcast system would typically be located.

What is claimed is:

1. A method for reducing multi-path fading in a radio broadcasting system adapted to broadcast signals having frequencies in the range of about 300 MHz to about 3,000 MHz comprising:

broadcasting a first signal using spread spectrum modulation from a first satellite source traveling on a geosynchronous orbit;

substantially simultaneously broadcasting a second signal using spread spectrum modulation, said second signal having substantially the same content and frequency as said first signal from a second satellite source on said geosynchronous orbit, said second satellite source being spaced from said first satellite source a predetermined number of degrees to reduce multi-path fading and to reduce signal attenuation from physical objects in the paths of said first signal and said second signal and producing an output signal from said first signal and said second signal at a plurality of fixed receivers, at least some of said fixed receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz and a plurality of mobile receivers, at least some of said mobile receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz.

2. The method of claim 1 further comprising measuring the signal strengths of said first and said second signals, and selecting the stronger signal from said first and said second signals.

3. The method of claim 1 further comprising combining said first and said second signals to form said output signal.

4. The method of claim 1 wherein said first and said second signals are modulated sufficiently to resist multi-path fading.

5. The method of claim 2 wherein said first and said second signals are modulated sufficiently to resist multi-path fading.

6. The method of claim 3 wherein said first and said second signals are modulated sufficiently to resist multi-path fading.

7. The method of claim 1 or claim 2 or claim 3 or claim 4 or claim 5 or claim 6 wherein said predetermined number of degrees is in the range of about 25 degrees to about 50 degrees.

8. A method for reducing satellite-based transmitter power in a radio broadcasting system adapted to broadcast radio signals having frequencies in the range of about 300 MHz to about 3,000 MHz comprising:

broadcasting on a first path a first broadcast signal that includes audio program information from a first satellite source traveling on a substantially geosynchronous orbit;

substantially simultaneously broadcasting on a second path a second broadcast signal having substantially the same content and frequency as said first broadcast signal from a second satellite source on said substantially geosynchronous orbit, said second satellite source and said second path being spaced from said first satellite source and said first path a predetermined number of degrees to reduce the power needed to transmit said first and said second signals to a receiver at or near the earth's surface; and assembling and producing said broadcast signal as an output signal from said first broadcast signal and said second broadcast signal at a plurality of fixed receivers, at least some of said fixed receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz having at least one channel to receive said first broadcast signal and at least one channel to receive said second broadcast signal, and a plurality of mobile receivers, at least some of said mobile receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz having at least one channel to receive said first broadcast signal and at least one channel to receive said second broadcast signal located at or near the earth's surface.

9. A method for reducing satellite-based transmitter power in a radio broadcasting system adapted to broadcast radio signals having frequencies in the range of about 300 MHz to about 3,000 MHz comprising:

broadcasting on a first path a first broadcast signal that includes audio program information from a first satellite source traveling on a substantially geosynchronous orbit;

substantially simultaneously broadcasting on a second path a second broadcast signal with substantially identical content from a second satellite source on said substantially geosynchronous orbit, said second satellite source and said second path being spaced from said first satellite source and said first path a predetermined number of degrees to reduce the power needed to transmit said first and said second broadcast signal to the earth's surface, said second broadcast signal having a frequency different from the frequency of said first broadcast signal; and assembling and producing said broadcast signal as an output signal from said first and said second broadcast signals at a plurality of fixed receivers at least some of said fixed receivers being connected to substantially flat, hemispherical coverage antennas having an outer diameter no greater than about 10 inches, said antennas being adapted to receive said frequencies in the range of about 300 MHz to about 3,000 MHz having at least one channel to receive said first broadcast signal and at least one channel to receive said second broadcast signal, and a plurality of mobile receivers, at least some of said mobile receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz having at least one channel to receive said first broadcast signal and at least one channel to receive said second broadcast signal.

10. A method for improving signal reception in a radio system comprising:

broadcasting on a first path a first broadcast signal that includes audio program information having a frequency in the range of about 300 MHz to about 3,000 MHz from a first satellite source traveling on a substantially geosynchronous orbit;

substantially simultaneously broadcasting on a second path a second broadcast signal with identical content having substantially the same frequency as said first broadcast signal or having a frequency different from the frequency of said first broadcast signal from a second satellite source on said substantially geosynchronous orbit, said second satellite source and said second path being spaced from said first satellite source and said first path a predetermined number of degrees to improve reception of said first and said second broadcast signals at a plurality of fixed receivers located at or near the earth's surface, and at least some of said fixed receivers being connected to substantially flat, hemispherical coverage antennas having an outer diameter no greater than about 10 inches, said antennas being adapted to receive said frequencies in the range of about 300 MHz to about 3,000 MHz, and a plurality of mobile receivers, at least some of said mobile receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz;

assembling and producing said broadcast signal as an output signal from said first broadcast signal and said second broadcast signal at said plurality of fixed receivers, at least some of said fixed receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz having at least one channel to receive said first broadcast signal and at least one channel to receive said second broadcast signal, and said plurality of mobile receivers, at least some of said mobile receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz having at least one channel to receive said first broadcast signal and at least one channel to receive said second broadcast signal.

11. A method for reducing foliage attenuation and signal outage from radio path blockage in a radio broadcasting system adapted to broadcast signals having frequencies in the range of about 300 MHZ to about 3,000 MHZ comprising:

broadcasting on a first path a first broadcast signal that includes audio program information having a frequency in said range from a first satellite source traveling on a substantially geosynchronous orbit;

substantially simultaneously broadcasting on a second path a second broadcast signal with identical content having substantially the same frequency as said first broadcast signal or having a frequency different from the frequency of said first broadcast signal from a second satellite source on said geosynchronous orbit, said second satellite source and said second path being spaced from said first satellite source and said first path a predetermined number of degrees to minimize foliage attenuation or radio path blockage; and assembling and producing said broadcast signal as an output signal from said first broadcast signal and said second broadcast signal at a plurality of fixed receivers at least some of said fixed receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz having at least one channel to receive said first broadcast signal and at least one channel to receive said second broadcast signal, and a plurality of mobile receivers, at least some of said mobile receivers being connected to substantially flat, hemispherical coverage located at or near the surface of the earth, and antennas having an outer diameter no greater than about 10 inches, said antennas being adapted to receive said frequencies in the range of about 300 MHz to about 3,000 MHz having at least one channel to receive said first broadcast signal and at least one channel to receive said second broadcast signal.

12. The method of claim 8 or claim 9 or claim 10 or claim 11 wherein said first satellite source comprises at least two separate satellites to provide additional broadcast signal paths.

13. The method of claim 8 or claim 9 or claim 10 or claim 11 wherein said second satellite source comprises at least two separate satellites to provide additional broadcast signal paths.

14. The method of claim 8 or claim 9 or claim 10 or claim 11 wherein said predetermined number of degrees is in the range of about 25 degrees to about 50 degrees.

15. The method of claim 8 or claim 9 or claim 10 or claim 11 further comprising broadcasting said first broadcast signal and said second broadcast signal at opposite polarizations, and where the frequency of said first broadcast signal is substantially the same as the frequency of said second broadcast signal.

16. The method of claim 8 or claim 9 or claim 10 or claim 11 wherein said first broadcast signal and said second broadcast signal are at opposite polarizations and where the frequency of said first signal is different from the frequency of said second broadcast signal.

17. A UHF radio system adapted to broadcast signals having frequencies in a range of about 300 MHz to about 3,000 MHz comprising:

a broadcasting source for broadcasting on a first path a first broadcast signal that includes audio program information on a first satellite source traveling in a substantially geosynchronous orbit;

a broadcasting source for broadcasting on a second path a second broadcast signal from a second satellite source traveling in said substantially geosynchronous orbit, said second satellite source and said second path being spaced from said first satellite source and said first path a predetermined number of degrees to minimize outage and fading of said first and said second broadcast signals; and a plurality of fixed receivers, at least some of said fixed receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz, and a plurality of mobile receivers, at least some of said mobile receivers being connected to substantially flat, hemispherical coverage antennas located at or near the surface of the earth, and having an outer diameter no greater than about 10 inches, said antennas being adapted to receive said frequencies in the range of about 300 MHz to about 3,000 MHz for receiving said first and said second broadcast signals, each of said fixed and said mobile receivers being located at or near the surface of the earth, each of said receivers being adapted to produce said broadcast signal as an output signal from said first and said second broadcast signals, each of said receivers including at least one channel to receive said first broadcast signal and at least one channel to receive said second broadcast signal.

18. The system of claim 17 further comprising, in each of said receivers, means for measuring the strengths of broadcast signals from said first and said second satellite sources, and means for selecting the stronger broadcast signal from said first and said second signals for output.

19. The system of claim 17 wherein said receiver includes means for combining said first and said second broadcast signals.

20. The system of claim 17 or claim 18 or claim 19 further comprising means for modulating said first and said second broadcast signals to reduce multipath fading.

21. The system of claim 17 or claim 18 or claim 19 wherein said second satellite source is adapted to produce a second broadcast signal having a frequency different from the frequency of said first broadcast signal.

22. The system of claim 17 or claim 18 or claim 19 further comprising a UHF radio receiver that comprises means for measuring the signal strengths of said first and said second broadcast signals and means for forming and outputting the broadcast source from said first and said second broadcast signals.

23. The system of claim 17 or claim 18 or claim 19 wherein said second satellite source is adapted to produce a second broadcast signal having a polarization opposite from the polarization of said first broadcast signal.

24. The method of claim 8 or claim 9 or claim 10 or claim 11 wherein said assembling step comprises selection of said first broadcast signal or said second broadcast signal for output from at least one of said receivers.

25. The method of claim 8 or claim 9 or claim 10 or claim 11 wherein said assembling step comprises combining said first broadcast signal and said second broadcast signal to produce said output signal at at least one of said receivers.

26. The method of claim 8 or claim 9 or claim 10 or claim 11 wherein said predetermined number of degrees is sufficient to position substantially all of said receivers substantially within line-of-sight of said first satellite source and said second satellite source.

27. The system of claim 17 or claim 18 or claim 19 wherein said first satellite source and said second satellite source are spaced apart a distance sufficient to position substantially all of said receivers substantially within line-of-sight of said first and said second satellite sources.

28. The method of claim 8 or claim 9 or claim 10 or claim 11 further comprising utilizing spread spectrum modulation in said broadcasting.

29. The system of claim 17 wherein said broadcasting source utilizes spread spectrum modulation.

* * * * *